(12) United States Patent
Lee

(10) Patent No.: US 7,895,508 B2
(45) Date of Patent: Feb. 22, 2011

(54) NETWORK SCANNING METHOD AND IMAGE SCANNING DEVICE HAVING NETWORK SCAN FUNCTION USING THE SAME

(75) Inventor: Kee-Chang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1203 days.

(21) Appl. No.: 11/514,874

(22) Filed: Sep. 5, 2006

(65) Prior Publication Data

US 2007/0074291 A1 Mar. 29, 2007

(30) Foreign Application Priority Data

Sep. 27, 2005 (KR) .................. 10-2005-0089691

(51) Int. Cl.
G08C 25/00 (2006.01)
H03M 13/00 (2006.01)
H04L 13/00 (2006.01)

(52) U.S. Cl. ........................................ 714/799; 705/42
(58) Field of Classification Search ................ 714/799; 709/217; 358/1.13, 1.16, 1.15, 403; 750/42; 701/1; 710/5
See application file for complete search history.

(56) References Cited

U.S. PATENT DOCUMENTS

| | | | | |
|---|---|---|---|---|
| 5,764,866 A * | 6/1998 | Maniwa | ...................... | 358/1.15 |
| 5,905,582 A * | 5/1999 | Hirai et al. | ................... | 358/468 |
| 6,425,001 B2 * | 7/2002 | Lo et al. | ...................... | 709/217 |
| 7,293,114 B2 * | 11/2007 | Yashiki et al. | .................. | 710/5 |
| 7,492,946 B2 * | 2/2009 | Elder et al. | .................. | 382/187 |
| 7,523,086 B1 * | 4/2009 | Teague et al. | ................... | 707/1 |
| 2004/0027601 A1 * | 2/2004 | Ito et al. | ..................... | 358/1.13 |
| 2004/0186892 A1 * | 9/2004 | Maruyama et al. | .......... | 709/206 |
| 2005/0097046 A1 * | 5/2005 | Singfield | ..................... | 705/42 |

FOREIGN PATENT DOCUMENTS

| | | |
|---|---|---|
| EP | 1 143 695 A | 10/2001 |
| EP | 1 178 661 A | 2/2002 |
| EP | 1 292 095 A | 3/2003 |
| EP | 1 416 709 A | 5/2004 |
| EP | 1 422 920 A | 5/2004 |
| JP | 2001-169045 | 6/2001 |
| JP | 2002-094718 | 3/2002 |
| KR | 1999-0026822 | 4/1999 |
| KR | 1999-0081324 | 11/1999 |
| KR | 10-2005-0053989 | 6/2005 |
| KR | 10-2005-0077104 | 8/2005 |

* cited by examiner

*Primary Examiner*—Sam Rizk
(74) *Attorney, Agent, or Firm*—Roylance, Abrams, Berdo & Goodman L.L.P.

(57) ABSTRACT

A network scanning method and device are provided that allow an image scanning device to scan documents and transmit the scan data to a server. The image scanning device checks a connection between the image scanning device and a server, generates scan data by scanning documents, stores the generated scan data in a storage unit if a connection error exists between the image scanning device and the server, and checks whether the connection error between the image scanning device and the server is corrected. The image scanning device transmits the scan data stored in the storage unit to the server when the connection error has been corrected. Transmission of scan data is delayed until the connection error to the server is corrected, thereby reducing inconvenience in having to reset network settings after waiting until the connection error to the server has been corrected.

21 Claims, 3 Drawing Sheets

NETWORK SCANNING METHOD AND IMAGE SCANNING DEVICE HAVING NETWORK SCAN FUNCTION USING THE SAME

PRIORITY

This application claims the benefit under 35 U.S.C. §119(a) of Korean Patent Application No. 10-2005-0089691, filed Sep. 27, 2005, in the Korean Intellectual Property Office, the entire disclosure of which is hereby incorporated by reference.

BACKGROUND OF THE INVENTION

1. Field of the Invention

The present invention relates to a scanner or an image scanning device such as a multi-function product (MFP) having a scan function. More particularly, the present invention relates to a network scanning method, which allows an image scanning device to transmit scan data to a server selected by a user, and an image scanning device using the same.

2. Description of the Related Art

A multi-function product (MFP) having a scan function reads document data from a page of a document to be scanned, and prints or transmits the read document data to an external device using a communication device such as a modem. A network scan function comprises sharing a scanner or an MFP having a scan function with a plurality of users and transmitting scan data generated by scanning a document using the scanner to a server selected by a user.

Conventional operation of a network scanning system including servers and a scanner will now be described. A user selects a server to transmit scan data to and provides server authentication information, that is, an identification (ID) and password, and a scan option. The scanner generates scan data by scanning a document according to the input scan option and transmits the generated scan data to the selected server.

FIG. 1 is a flowchart of a conventional network scanning method in which an image scanning device having a network scanning function, such as a scanner or an MFP, generates scan data and transmits the generated scan data to a server. Referring to FIG. 1, the image scanning device begins to scan a document desired by a user in operation 100 and determines whether an error exists in a connection to a server, step 110. If the connection between the image scanning device and the server is normal, the image scanning device transmits scan data to the server in step 120. If the connection between the image scanning device and the server is abnormal, the image scanning device stops scanning and terminates the network scanning operation requested by the user in step 130.

When a network scanning function is performed using the conventional network scanning method described above, if a connection error exists between an image scanning device and a server, a user must wait until the connection error is fixed. Even after the connection error is fixed, the user must perform a user authentication process, a server selection process, and a scan option setting process, for a subsequent network scanning operation. In particular, when the quantity of documents to be scanned is large, the user may have to wait for the image scanning device for a very long scan time because of the possibility of scanning operations being interrupted due to connection errors.

SUMMARY OF THE INVENTION

Exemplary embodiments of the present invention provide a method and device for network scanning which allows an image scanning device having a network scan function, such as a scanner or a multi-function product (MFP), to perform a normal scanning operation even when a connection error exists between the image scanning device and a server.

According to exemplary embodiments of the present invention, there is provided a method of performing network scanning in an image scanning device having a scan function, the method comprising checking a connection between the image scanning device and a server, generating scan data by scanning documents, storing the generated scan data in a storage unit if a connection error exists between the image scanning device and the server, checking whether the connection error between the image scanning device and the server is recovered, and transmitting the scan data stored in the storage unit to the server when the connection error is recovered.

In an exemplary implementation, the method can further comprise performing user authentication by inputting user information from a user, or receiving from the user at least one of a file format of the scan data, scan resolution, and scanning color as scan settings.

In an exemplary implementation, the method can further comprise providing connection error information to the user if a connection error exists between the image scanning device and the server. The input scan settings may be stored in the storage unit with the scan data.

Exemplary implementations may check, in a period of time, whether the connection error between the image scanning device and the server is recovered, and the predetermined period of time may be set by the user.

In an exemplary implementation, the method may further comprise providing a scan data transmission result to the user after the scan data is transmitted to the server. In exemplary implementations, the scan data transmission result can be provided to the user using email or fax.

According to exemplary embodiments of the present invention, an image scanning device is provided comprising a scanning unit for generating scan data by scanning documents, a storage unit for storing the scan data, a data transmitter for checking a connection to a server and transmitting the scan data to the server, and a controller for storing the generated scan data in the storage unit when an error exists in a connection to the server and controlling the data transmitter to check whether the connection error to the server is fixed and transmitting the scan data stored in the storage unit to the server when the connection error is fixed.

In an exemplary implementation, the image scanning device can further comprise a user interface for inputting user information from a user. The controller can perform user authentication using the input user information.

In an exemplary implementation, the image scanning device can further comprise a user interface for inputting from the user at least one of a file format of the scan data, scan resolution, and scanning color as scan settings.

In an exemplary implementation, the image scanning device can further comprise a user interface for providing connection error information to the user if an error exists in a connection to the server. The controller can store the input scan settings in the storage unit with the scan data.

In an exemplary implementation, the controller can check in a period of time whether the connection error to the server is fixed, and the period of time can be set by the user.

In an exemplary implementation, the image scanning device can further comprise a user interface for providing a scan data transmission result to the user after the scan data is transmitted to the server. The user interface can provide the scan data transmission result to the user using email or fax.

In an exemplary implementation, the image scanning device can further comprise an image converter converting the scan data to data of the file format input by the user.

In exemplary embodiments of the present invention there is provided a computer readable recording medium having recorded thereon a computer readable program for performing the network scanning method.

BRIEF DESCRIPTION OF THE DRAWINGS

The above and other exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
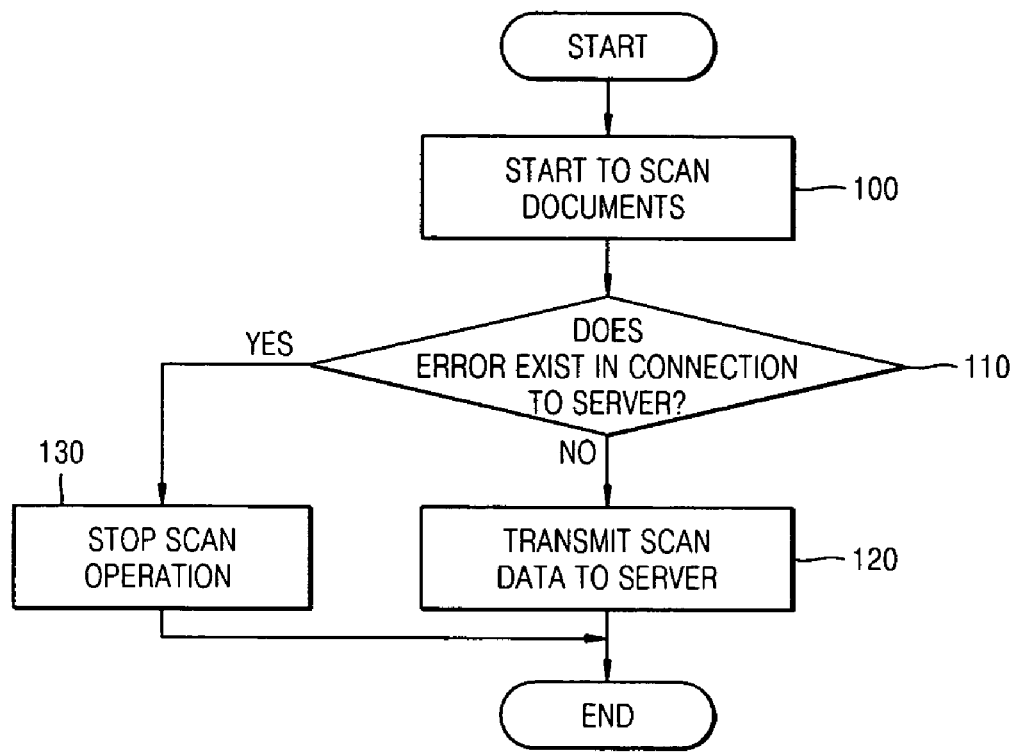
FIG. 1 is a flowchart of a conventional network scanning method.
Figure 2:
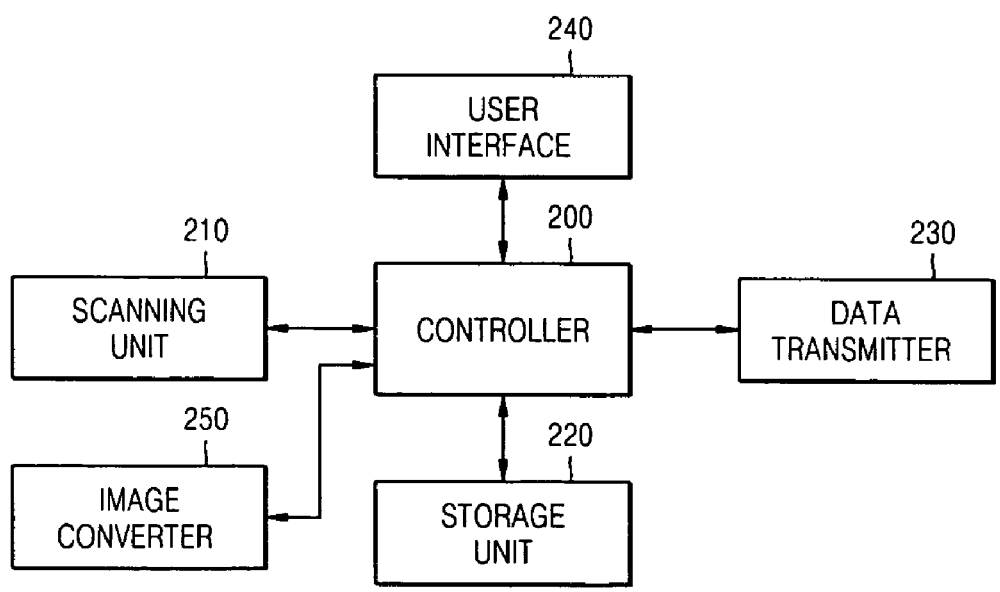
FIG. 2 is a block diagram of an image scanning device having a network scan function according to an exemplary embodiment of the present invention.
Figure 3:
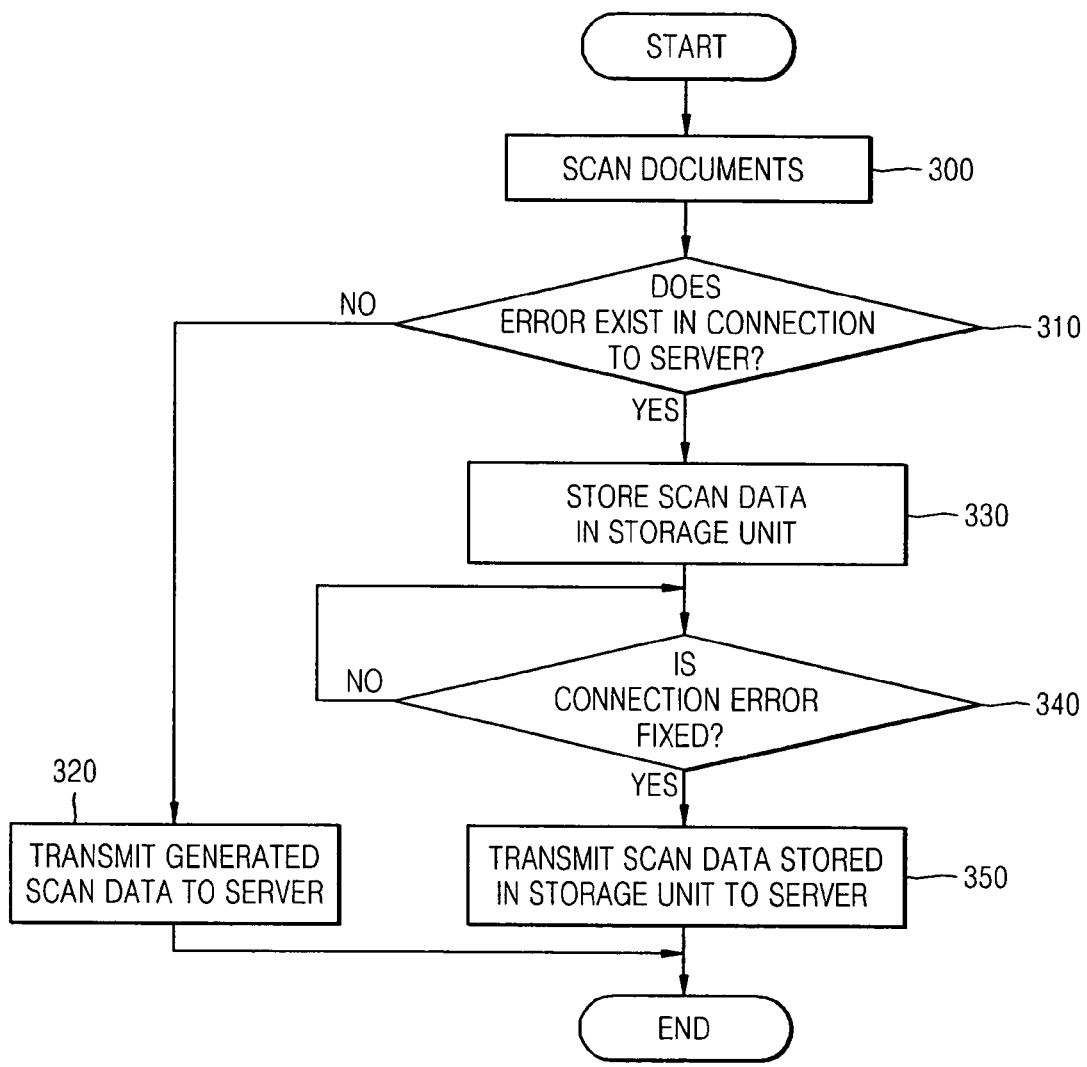
FIG. 3 is a flowchart of a network scanning method according to an exemplary embodiment of the present invention.

FIG. 2 is a block diagram of an image scanning device having a network scan function according to an exemplary embodiment of the present invention. The image scanning device comprises a controller 200, a scanning unit 210, a storage unit 220, and a data transmitter 230. An operation of the image scanning device of FIG. 2 will now be described in conjunction with a flowchart of a network scanning method according to an exemplary embodiment of the present invention illustrated in FIG. 3.

When a network scanning operation is requested by a user, the controller 200 generates a scan operation start signal and outputs the scan operation start signal to the scanning unit 210. The scanning unit 210 generates scan data by scanning documents in response to the scan operation start signal in step 300.

The controller 200 generates a network connection checking signal and outputs the network connection checking signal to the data transmitter 230. The data transmitter 230 checks whether an error exists in a connection to a server (not shown) in response to the network connection checking signal in step 310. If an error does not exist in the connection to the server, the controller 200 transmits the generated scan data to the server through the transmitter 230 in step 320.

A connection error between the server and the image scanning device corresponds to any case where data transmission/reception between the server and the image scanning device is impossible, such as, for example, when the server is turned off, when the server abnormally operates, when an error exists in a network, or when an error exists in network settings.

If an error exists in the server connection, the controller 200 stores the scan data generated by the scanning unit 210 in the storage unit 220 in step 330. In an exemplary implementation of the present invention, the storage unit 220 comprises a hard disk in which bulk scan data can be stored.

The controller 200 generates a network connection checking signal in a certain period and outputs the generated network connection checking signal to the data transmitter 230. The data transmitter 230 repeatedly checks whether the connection error to the server has been corrected in response to each network connection checking signal in operation 340. Correction of the connection error to the server can be periodically checked, and the period for checking whether the connection error to the server has been corrected can be user-defined.

If the connection error to the server is recovered, the controller 200 transmits the scan data stored in the storage unit 220 to the server through the data transmitter 230 in step 350.

Figure 4:
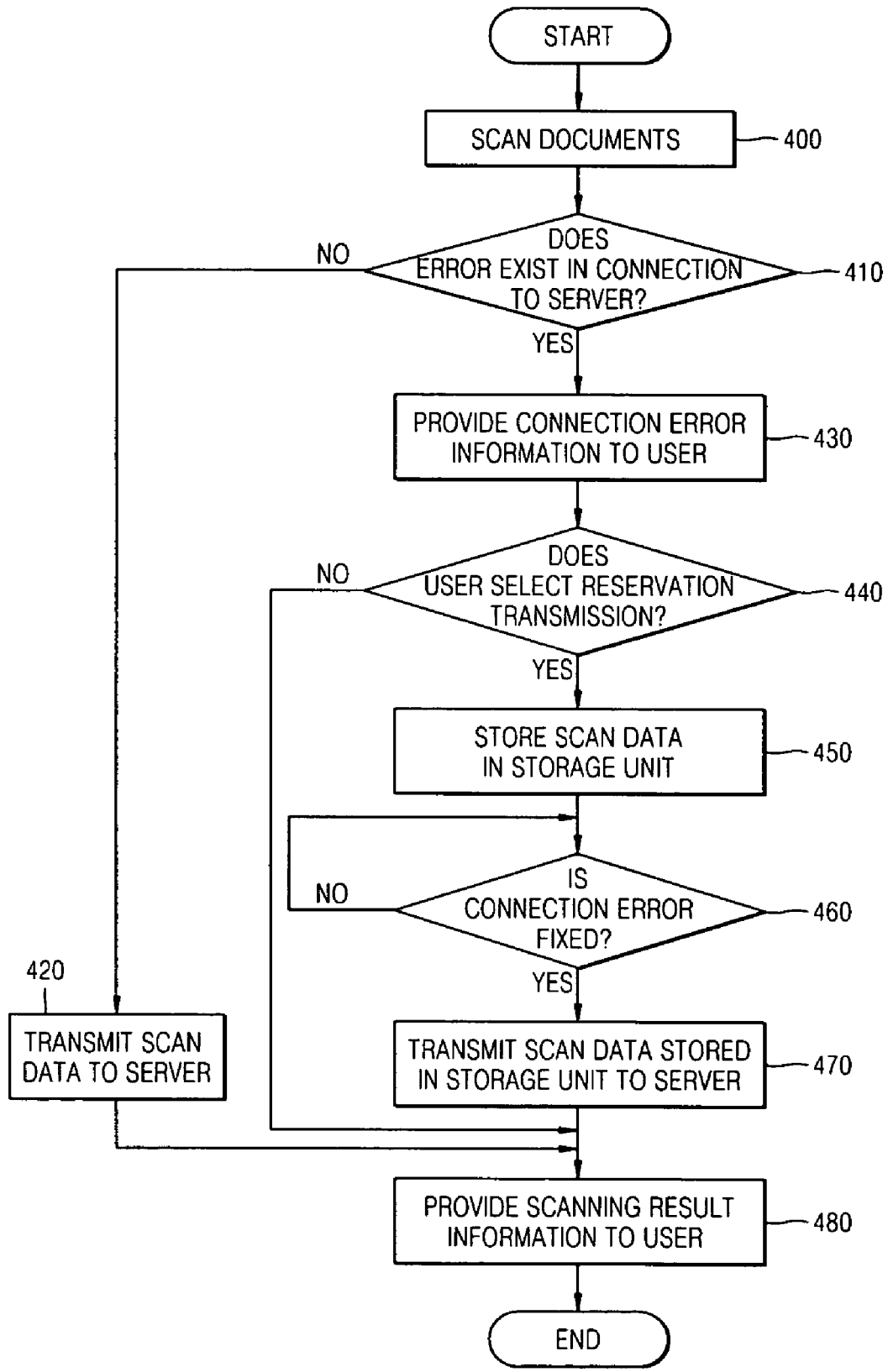
FIG. 4 is a flowchart of a network scanning method according to another exemplary embodiment of the present invention.

FIG. 4 is a flowchart of a network scanning method according to another exemplary embodiment of the present invention wherein an image scanning device further includes a user interface 240, as illustrated in FIG. 2.

Referring to FIG. 4, the controller 200 controls the scanning unit 210 to generate scan data by scanning documents requested by a user in step 400, and the controller 200 controls the data transmitter 230 to check whether an error exists in a connection to a server (not shown) in step 410. If an error does not exist in the server connection, the data transmitter 230 transmits the generated scan data to the server in step 420. If an error does exist in the server connection, the user interface 240 provides connection error information to the user in step 430 and inputs whether a reservation transmission is selected in step 440. In an exemplary implementation, the user interface 240 includes a display unit, such as a liquid crystal display (LCD), for displaying the connection error information and an inquiry on whether the reservation transmission is selected. In exemplary implementations, the user interface 240 includes a button input unit for inputting whether the reservation transmission is selected. If the user does not select the reservation transmission, the controller 200 terminates the network scanning operation.

If the user selects the reservation transmission, the controller 200 stores the generated scan data in the storage unit 220 in step 450. In step 460, the data transmitter 230 repeatedly checks, in a certain period of time, whether the connection error to the server is corrected. If the connection error to the server is corrected, the data transmitter 230 transmits the scan data stored in the storage unit 220 to the server in step 470.

The user interface 240 provides scanning result information of the network scanning operation requested by the user to the user in step 480. The scanning result information may be information indicating that the scan data has been successfully transmitted or that the transmission of the scan data has failed. In exemplary implementations, the scanning result information can be transmitted via email or fax.

In a network scanning method according to another exemplary embodiment of the present invention, the network scanning method may further include receiving an ID and password through the user interface 240 and performing, in the controller 200, user authentication using the input ID and password. The controller 200 can thus confirm whether the user who has requested the network scanning operation is an authorized user using the ID and password. In an exemplary implementation, when user information is input through the user authentication process, the controller 200 detects an email address or fax number of the user using the input user information, and the user interface 240 provides the scanning result information to the user using the detected user email address or fax number. The storage unit 220 can store the user email address or fax number in conjunction with the authorized user's ID.

In a network scanning method according to another exemplary embodiment of the present invention, the network scanning method may further include inputting from the user scan settings, such as information regarding the server to transmit scan data to, a desired file format of the scan data, scan resolution, and whether to use color scanning.

An image scanning device according to an exemplary embodiment of the present invention can include an image converter 250, illustrated in FIG. 2. The image converter 250 converts the scan data generated by the scanning unit 210 to data of the input file format. In exemplary implementations, the file format of the scan data can be portable document format (PDF) or tag image file format (TIFF).

Exemplary embodiments of the invention can also be embodied as computer readable code on a computer readable recording medium. The computer readable recording medium can be any data storage device that can store data which can be thereafter read by a computer system. Examples of computer readable recording medium include read-only memory (ROM), random-access memory (RAM), CD-ROMs, magnetic tapes, floppy disks, optical data storage devices, and carrier waves (such as, for example, data transmission through the Internet).

As described above, by using a network scanning method and device for image scanning according to exemplary embodiments of the present invention, even if an error exists in a connection to a server, a scanning operation is not cancelled and transmission of scan data can be delayed until the connection error to the server is corrected, thereby reducing the inconvenience that the user has to experience in performing the network scanning operation again after waiting until the connection error to the server is corrected. In addition, result information on the network scanning operation requested by the user can be provided to the user.

While the present invention has been particularly shown and described with reference to exemplary embodiments thereof, it will be understood by those of ordinary skill in the art that various changes in form and detail may be made therein without departing from the spirit and scope of the present invention as defined by the following claims and equivalents thereof.

What is claimed is:

1. A method of performing network scanning, the method comprising:
   checking a connection between an image scanning device and a server;
   receiving scan setting data;
   storing the scan setting data;
   generating scan data by scanning documents according to the scan setting data;
   storing the generated scan data if a connection error exists between the image scanning device and the server; and
   transmitting the stored scan data to the server when the connection error is corrected,
   wherein the scan setting data comprises at least one of a file format of the scan data, a scan resolution, and scanning color.

2. The method of claim 1, further comprising performing user authentication.

3. The method of claim 1, further comprising providing connection error information if a connection error exists between the image scanning device and the server.

4. The method of claim 1, wherein correction of the connection between the image scanning device and the server is checked within a certain period of time.

5. The method of claim 4, wherein the period of time is set by a user.

6. The method of claim 1, further comprising providing a scan data transmission result after the scan data is transmitted to the server.

7. The method of claim 6, wherein the san data is transmitted to the server using an email or fax.

8. The method of claim 1, wherein the generated scan data is stored in a storage unit.

9. The method of claim 1, wherein the scan setting data is stored in a storage unit with the scan data.

10. An image scanning device comprising:
    a scanning unit for generating scan data;
    a storage unit for storing the scan data;
    a data transmitter for checking a connection to a server and transmitting the scan data to the server;
    a controller for storing the scan data in the storage unit when an error exists in the connection to the server and controlling the data transmitter to transmit the scan data stored in the storage unit to the server when the connection error is corrected;
    a user interface for receiving scan setting data and
    an image converter for converting the scan data according to the scan setting data,
    wherein the controller stores the input scan settings in the storage unit, and wherein the scan setting data comprises at least one of a file format of the scan data, a scan resolution, and scanning color.

11. The image scanning device of claim 10, wherein the controller performs user authentication.

12. The image scanning device of claim 10, further comprising a user interface for providing connection error information if an error exists in a connection to the server.

13. The image scanning device of claim 10, wherein correction of the connection error to the server is checked by the controller within a certain period of time.

14. The image scanning device of claim 13, wherein the period of time is set by a user.

15. The image scanning device of claim 10, further comprising a user interface for outputting a scan data transmission result after the scan data is transmitted to the server.

16. The image scanning device of claim 15, wherein the san data is transmitted to the server using an email or fax.

17. A computer readable medium having stored thereon instructions for performing network scanning in an image scanning device, the instructions comprising:
    a first set of instructions for checking a connection between the image scanning device and a server;
    a second set of instructions for generating scan data by scanning documents;
    a third set of instructions for storing the generated scan data if a connection error exists between the image scanning device and the server;
    a fourth set of instructions for transmitting the stored scan data stored in the storage unit to the server when the connection error is corrected;
    a fifth set of instructions for performing user authentication; and
    a sixth set of instructions for receiving scan setting data, wherein the input scan settings are stored in a storage unit with the scan data, and wherein the scan setting data comprises at least one of a file format of the scan data, a scan resolution, and scanning color.

18. The instructions of claim 17, further comprising a seventh set of instructions for providing connection error information if a connection error exists between the image scanning device and the server.

19. The instructions of claim 17, wherein correction of the connection between the image scanning device and the server is checked within a certain period of time.

20. The instructions of claim 19, wherein the period of time is set by a user.

21. The instructions of claim 17, further comprising an eight set of instructions for providing a scan data transmission result after the scan data is transmitted to the server.

* * * * *